United States Patent [19]

McCloskey et al.

[11] Patent Number: 5,886,073
[45] Date of Patent: Mar. 23, 1999

[54] POLYCARBONATE REDISTRIBUTION METHOD WITH CATALYST DECOMPOSITION

[75] Inventors: Patrick Joseph McCloskey, Watervliet; David Michel Dardaris, Ballston Spa, both of N.Y.

[73] Assignee: General Electric Company, Schenectady, N.Y.

[21] Appl. No.: 963,177

[22] Filed: Nov. 3, 1997

[51] Int. Cl.⁶ .......................................................... C08J 5/51
[52] U.S. Cl. ........................... 524/154; 524/317; 524/376; 524/386; 525/461; 525/462; 528/198; 528/204
[58] Field of Search ..................................... 525/461, 462; 528/198, 204; 524/154, 317, 318, 376, 378, 386, 387

[56] References Cited

U.S. PATENT DOCUMENTS

| | | |
|---|---|---|
| 3,541,049 | 11/1970 | Cleveland . |
| 3,799,953 | 3/1974 | Freitag et al. . |
| 4,185,009 | 1/1980 | Idel et al. . |
| 4,431,793 | 2/1984 | Rosenquist . |
| 4,469,861 | 9/1984 | Mark et al. . |
| 5,021,521 | 6/1991 | Krabbenhoft et al. . |
| 5,097,008 | 3/1992 | Krabbenhoft et al. . |
| 5,414,057 | 5/1995 | Campbell et al. . |
| 5,459,226 | 10/1995 | King, Jr. et al. . |
| 5,567,802 | 10/1996 | McCloskey ............................. 528/487 |
| 5,637,655 | 6/1997 | Priddy et al. ............................ 525/438 |
| 5,652,312 | 7/1997 | Phelps et al. . |

FOREIGN PATENT DOCUMENTS

| | | |
|---|---|---|
| 819718 | 12/1996 | European Pat. Off. . |
| 64-001724 | 1/1989 | Japan . |

*Primary Examiner*—Robert Dawson
*Assistant Examiner*—D. Aylward
*Attorney, Agent, or Firm*—Noreen C. Johnson; Douglas E. Stoner

[57] ABSTRACT

Redistribution of polycarbonate compositions is effected in the presence of a tetraorganophosphonium hydroxide as catalyst and a catalyst decomposing amount of a polyhydroxyaliphatic compound such as glyceryl monostearate, pentaerythritol or ethylene glycol. Catalyst decomposition after redistribution improves the stability of the redistributed polycarbonate composition.

20 Claims, No Drawings

5,886,073

POLYCARBONATE REDISTRIBUTION METHOD WITH CATALYST DECOMPOSITION

BACKGROUND OF THE INVENTION

This invention relates to the redistribution of polycarbonates, and more particularly to a redistribution method employing a tetraorganophosphonium hydroxide as catalyst and an agent for decomposition of said catalyst.

Polycarbonates have traditionally been prepared by an interfacial method involving the reaction of a dihydroxyaromatic compound with phosgene, or a melt method in which the phosgene is replaced by a diaryl carbonate. In recent years, however, a redistribution process for use with polycarbonates has been developed. This process, described in U.S. Pat. Nos. 5,414,057 and 5,459,226, comprises heating an already formed polycarbonate in the presence of a redistribution catalyst to produce a polycarbonate with a different, generally lower, molecular weight. The method is highly useful commercially because it permits the preparation from monomeric materials of a single high molecular weight polycarbonate, which may then undergo redistribution to yield a spectrum of lower molecular weight materials which can be custom designed depending on their intended uses. A similar method, applicable to polyestercarbonates, is disclosed in U.S. Pat. No. 5,652,312.

A broad spectrum of redistribution catalysts is disclosed in U.S. Pat. No. 5,414,057, and the use of tetraorganophosphonium carboxylates as catalysts is disclosed in U.S. Pat. No. 5,459,226. Another excellent class of catalysts, disclosed in U.S. Pat. No. 5,567,802, is the tetraorganophosphonium hydroxides. They are frequently characterized by high efficiency. However, according to the procedure described in that patent the tetraorganophosphonium hydroxide remains in the polycarbonate after redistribution and can cause hydrolytic, melt and color instability.

There is a need, therefore, for materials which can be incorporated into redistribution mixtures containing tetraorganophosphonium hydroxides as catalysts and which cause decomposition of the catalyst after its function has been performed. Thus, such materials would have two requirements: to function only after redistribution has taken place and to cause efficient decomposition of the catalyst to harmless materials.

SUMMARY OF THE INVENTION

The present invention provides a method and compositions for polycarbonate redistribution which have the above-listed advantages. It is based on the discovery that aliphatic polyols are effective reagents for decomposition of tetraorganophosphonium hydroxides after completion of their function as redistribution catalysts.

In one of its aspects, therefore, the invention is a method for redistributing an organic polycarbonate composition which comprises contacting, at a temperature effective for redistribution, an initial organic polycarbonate composition characterized by an initial weight average molecular weight, with a redistributing amount of at least one tetraorganophosphonium hydroxide as catalyst and a catalyst decomposing amount of at least one polyhydroxyaliphatic compound, thereby forming a polycarbonate composition having a weight average molecular weight different from said initial molecular weight.

Another aspect of the invention is polycarbonate compositions capable of redistribution, said compositions comprising an organic polycarbonate composition, tetraorganophosphonium hydroxide and polyhydroxyaliphatic compound as described hereinabove.

DETAILED DESCRIPTION; PREFERRED EMBODIMENTS

Any linear or branched polycarbonate composition is an acceptable starting material for the method of this invention. Suitable polycarbonate compositions include aromatic and aliphatic polycarbonates.

Preferably, the initial polycarbonate composition is an aromatic polycarbonate. Such polycarbonates typically consist essentially of structural units of the formula

wherein at least about 60 percent of the total number of R groups are aromatic organic radicals and the balance thereof are aliphatic, alicyclic, or aromatic radicals. More preferably, R is an aromatic organic radical and still more preferably a radical of the formula

wherein each $A^1$ and $A^2$ is a monocyclic divalent aryl radical and Y is a bridging radical in which one or two carbon atoms separate $A^1$ and $A^2$. Such radicals frequently are derived from dihydroxyaromatic compounds of the formula

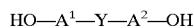

For example, $A^1$ and $A^2$ typically represent unsubstituted phenylene or substituted derivatives thereof. The bridging radical Y is most often a hydrocarbon group and particularly a saturated group such as methylene, cyclohexylidene or isopropylidene. The most preferred dihydroxyaromatic compound is bisphenol A, in which each of $A^1$ and $A^2$ is p-phenylene and Y is isopropylidene.

Typically, the weight average molecular weight of the initial polycarbonate composition may range from values as low as 500 to values as high as 200,000, as measured by gel permeation chromatography relative to polystyrene. Preferably, the weight average molecular weight of the initial polycarbonate composition ranges from about 5,000 to about 100,000; more preferably, from about 25,000 to about 65,000.

Copolymers, as well as homopolymers, can be redistributed according to the method of the invention. Two or more different dihydroxyaromatic compounds may be employed in the preparation of the copolymer. Alternatively, a copolymer prepared from a mixture of a dihydroxyaromatic compound with a glycol, such as propylene glycol, or with a hydroxy- or acid-terminated polyester may be redistributed. Copolyestercarbonates, prepared from the reaction of a dihydroxyaromatic compound with the combination of a carbonate source and a dibasic acid such as adipic acid, suberic acid, azelaic acid, 1,12-dodecanedicarboxylic acid or terephthalic acid, may also be redistributed. Further, blends of aromatic polycarbonate homopolymer with any of the above-described copolymers may be employed.

Branched polycarbonates may also be used as the initial composition. Any of the commercially available branched aromatic polycarbonates may be used, such as those disclosed in U.S. Pat. Nos. 3,541,049, 3,799,953, 4,185,009, 4,469,861 and 4,431,793, all of which are incorporated by reference herein in their entirety.

The method of the invention involves melt equilibrating the initial polycarbonate composition in the presence of two materials. The first material is a tetraorganophosphonium hydroxide, preferably a tetraalkyl- and most preferably a tetra-($C_{1-6}$ alkyl)phosphonium hydroxide. Tetra-n-butylphosphonium hydroxide is often preferred.

The second material is at least one polyhydroxyaliphatic compound, hereinafter sometimes designated "polyol". In general, any aliphatic compound containing at least two free hydroxy groups may be employed. The preferred polyols are compounds containing about 2–6 carbon atoms and ether and ester derivatives thereof, provided at least two free hydroxy groups per molecule are present. Illustrative compounds of this type are ethylene glycol, propylene glycol, neopentylene glycol, pentaerythritol, glycerol, and various acylated derivatives of these compounds, such as glyceryl monostearate and glyceryl monooleate.

It has been found that monohydroxy compounds, including aliphatic and aromatic compounds, decompose tetraorganophosphonium hydroxides to some extent under the conditions employed according to the invention. However, their effectiveness at a given concentration is much lower than that of the aliphatic polyols. Thus, the use of monohydroxy compounds is not contemplated as part of the present invention.

Typically, when the starting material is a single homopolymer or copolymer, redistribution converts the starting polycarbonate into a redistributed polycarbonate having a weight average molecular weight which is lower than the starting weight. When the starting composition is a blend of homopolymers or copolymers of different molecular weights, it is possible for the redistributed composition to have a molecular weight higher than at least one starting component and lower than at least one other starting component.

Preferably, the method of this invention does not include incorporation into the starting materials of branching agents. Examples of such branching agents are trimellitic anhydride acid chloride, cyanuric chloride and phenolic compounds having two or more hydroxy groups per molecule, for example 1,1,1-tris(4-hydroxyphenyl)ethane. Branching agents of this type will be recognized b those skilled in the art of polycarbonate synthesis and are described in U.S. Pat. Nos. 5,021,521 and 5,097,008. Such branching agents are known to equilibrate with linear aromatic polycarbonate compositions to form branched aromatic polycarbonate compositions.

The amount of tetraorganophosphonium hydroxide employed as redistribution catalyst may be any amount which is effective in promoting the redistribution process. Usually the effective amount will depend upon such parameters as the reaction rate desired, the molecular weight desired in the redistributed composition, and to a lesser extent the chemical nature of the initial polycarbonate composition. Depending upon such variables, an effective amount of catalyst can easily be determined without undue experimentation. The preferred amount is generally in the range of about 15–1,000 moles per million moles of carbonate structural units in the initial polycarbonate composition.

The amount of polyol is an amount effective to decompose the catalyst after its action is complete. In general, this amount will be in the range of about 250–750 ppm by weight based on initial polycarbonate composition, with about 250–600 ppm often being preferred.

It is generally preferred that at least a small proportion of water be present in the redistribution mixture to promote the reaction. This may be achieved by employing an aqueous solution of the tetraorganophosphonium hydroxide, typically a 20–60% solution by weight.

Optionally, a diaryl carbonate may be added to the initial polycarbonate composition. The diaryl carbonate functions to control molecular weight and serves as an efficient endcapping agent. Diaryl carbonates which are suitable include diphenyl carbonate and substituted diphenyl carbonates provided that the substituent is inert with respect to the redistribution process. Typical inert substituents include alkyl, halo, cyano, alkoxy, carboxy, aryl and nitro moieties. Preferably, the diaryl carbonate is unsubstituted diphenyl carbonate.

The amount of diaryl carbonate may be any amount which provides the desired molecular weight in the redistributed polycarbonate composition. Usually, the amount of diaryl carbonate is no greater than about 1.5 weight percent based upon the amount of starting polycarbonate, more preferably, no greater than about 1.0 weight percent.

The method of this invention can be effected by dry mixing the starting organic polycarbonate, the carbonate redistribution catalyst, the polyol and, optionally, the diaryl carbonate, and melt equilibrating the resulting mixture at a temperature effective for redistribution, typically in the range of about 180°–320° C. and preferably about 250°–300° C. Typical melt processing techniques are melt condensation in a Helicone reactor for approximately 5–30 minutes, and continuous extrusion through a single screw or twin screw extrusion device. One skilled in the art will recognize that if extrusion is employed, the screw speed and feed rate may vary. During heating, it may be necessary to vent gases formed during decomposition of the catalyst.

It is an advantage of the method of this invention that the molecular weight of the redistributed polycarbonate composition may be controlled to a fine degree. Control is generally obtained simply by varying the amounts of redistribution catalyst and diaryl carbonate employed in the redistribution process. In such a manner, it is possible to obtain from a single polycarbonate composition a variety of lower molecular weight redistributed compositions heretofore available only by interfacial or melt polymerization methods.

It is also possible to redistribute a mixture of high and lower molecular weight polycarbonates to obtain a polycarbonate of intermediate molecular weight. The latter generally have narrower molecular weight distributions, as represented by dispersivity (Mw/Mn), and lower melt viscosities than simple blends of the high and low molecular weight resins. Mixtures of linear and branched resins may also be redistributed. Finally, recycled polycarbonates, as illustrated by the linear optical disk grades and the branched blow molding grades, may be redistributed individually or in admixture; the products have the high ductility of the non-redistributed simple blends as well as other desirable properties.

The invention is illustrated by a series of examples in which a bisphenol A homopolycarbonate having a weight average molecular weight, as determined by gel permeation chromatography relative to polystyrene, of 34,000 was extruded on a twin screw extruder at 260° C. with 125 ppm by weight, based on polycarbonate, of tetra-n-butylphosphonium hydroxide and various amounts of polyols ("GMS" designating glyceryl monostearate). The extrudates were analyzed for residual tetra-n-butylphosphonium hydroxide and their molecular weights were determined. The results are given in the following table. Comparison was made with various controls employing no phosphonium hydroxide, no polyol and various monohydroxy compounds as replacements for polyol.

| | Hydroxy compound | | | |
|---|---|---|---|---|
| Example | Identity | Wt., ppm | Product Mw | Residual phosphonium cpd, ppm |
| 1 | GMS | 100 | 32,200 | 22.5 |
| 2 | GMS | 200 | 32,200 | 16.5 |
| 3 | GMS | 300 | 31,400 | 2.2 |
| 4 | GMS | 400 | 31,300 | 2.1 |
| 5 | GMS | 500 | 29,200 | 0 |
| 6 | Pentaerythritol | 300 | 29,200 | 0 |
| 7 | Ethylene glycol | 300 | 29.700 | 0 |
| Control 1* | — | — | 34,000 | — |
| Control 2 | — | — | 32,300 | 28.5 |
| Control 3 | Phenol | 300 | 31,100 | 22.5 |
| Control 4 | 1-Decanol | 300 | 33,300 | 16.0 |
| Control 5 | 1-Decanol | 600 | 28,400 | 17.4 |
| Control 6 | 1-Decanol | 900 | 28,900 | 4.0 |
| Control 7 | 1-Decanol | 1,200 | 28,900 | 4.0 |
| Control 8 | t-Butanol | 300 | 31,500 | 20.3 |
| Control 9 | t-Butanol | 600 | 30,000 | 20.0 |
| Control 10 | t-Butanol | 900 | 29,100 | 16.0 |
| Control 11 | t-Butanol | 1,200 | 29,600 | 16.8 |

*No phosphonium hydroxide

It is apparent from the table that glyceryl monostearate, pentaerythritol and ethylene glycol at levels of 300 ppm afforded products with very little or no detectable phosphonium hydroxide. By contrast, the controls employing monohydroxy compounds at the same level afforded products having substantially higher proportions of phosphonium hydroxide. Only Controls 6 and 7, employing 1-decanol at substantially higher levels, approached the polyols in effectiveness of catalyst decomposition

What is claimed is:

1. A method for redistributing an organic polycarbonate composition which comprises contacting, at a temperature effective for redistribution, an initial organic polycarbonate composition characterized by an initial weight average molecular weight, with a redistributing amount of at least one tetraorganophosphonium hydroxide as catalyst and a catalyst decomposing amount of at least one polyhydroxyaliphatic compound, thereby forming a polycarbonate composition having a weight average molecular weight different from said initial molecular weight.

2. A method according to claim 1 wherein the temperature is in the range of about 180°–320° C.

3. A method according to claim 2 wherein the polycarbonate is a bisphenol A polycarbonate.

4. A method according to claim 2 wherein the tetraorganophosphonium hydroxide is a tetraalkylphosphonium hydroxide.

5. A method according to claim 4 wherein the tetraalkylphosphonium hydroxide is tetra-n-butylphosphonium hydroxide.

6. A method according to claim 2 wherein the polyhydroxyaliphatic compound is a compound containing about 2–6 carbon atoms or an ether or ester derivative thereof.

7. A method according to claim 6 wherein the polyhydroxyaliphatic compound is glyceryl monostearate.

8. A method according to claim 6 wherein the polyhydroxyaliphatic compound is pentaerythritol.

9. A method according to claim 6 wherein the polyhydroxyaliphatic compound is ethylene glycol.

10. A method according to claim 2 wherein the proportion of tetraorganophosphonium hydroxide is in the range of about 50–1000 moles per million moles of carbonate structural units in the initial polycarbonate composition.

11. A method according to claim 2 wherein the proportion of polyhydroxyaliphatic compound is in the range of about 250–750 ppm by weight based on initial polycarbonate composition.

12. A polycarbonate composition capable of redistribution, said composition comprising an initial organic polycarbonate composition characterized by an initial weight average molecular weight, a redistributing amount of at least one tetraorganophosphonium hydroxide as catalyst and a catalyst decomposing amount of at least one polyhydroxyaliphatic compound.

13. A composition according to claim 12 wherein the polycarbonate is a bisphenol A polycarbonate.

14. A composition according to claim 12 wherein the tetraorganophosphonium hydroxide is a tetraalkylphosphonium hydroxide.

15. A composition according to claim 12 wherein the polyhydroxyaliphatic compound is a compound containing about 2–6 carbon atoms or an ether or ester derivative thereof.

16. A composition according to claim 15 wherein the polyhydroxyaliphatic compound is glyceryl monostearate.

17. A composition according to claim 15 wherein the polyhydroxyaliphatic compound is pentaerythritol.

18. A composition according to claim 15 wherein the polyhydroxyaliphatic compound is ethylene glycol.

19. A composition according to claim 12 wherein the proportion of tetraorganophosphonium hydroxide is in the range of about 50–1000 moles per million moles of carbonate structural units in the initial polycarbonate composition.

20. A composition according to claim 12 wherein the proportion of polyhydroxyaliphatic compound is in the range of about 250–750 ppm by weight based on initial polycarbonate composition.

* * * * *